United States Patent
Lin et al.

(10) Patent No.: US 12,234,630 B2
(45) Date of Patent: Feb. 25, 2025

(54) ANTI-SIPHONAGE WATER STORAGE DEVICE, SANITARY WATER SUPPLY DEVICE, AND SANITARY CLEANING DEVICE

(71) Applicant: Komoo Intelligent Technology Co., Ltd., Fujian (CN)

(72) Inventors: Xiaofa Lin, Fujian (CN); Xiaoshan Lin, Fujian (CN); Shan Lin, Fujian (CN); Zuhua Liu, Fujian (CN); Genyuan Lin, Fujian (CN)

(73) Assignee: Komoo Intelligent Technology Co., Ltd., Fujian (CN)

( * ) Notice: Subject to any disclaimer, the term of this patent is extended or adjusted under 35 U.S.C. 154(b) by 230 days.

(21) Appl. No.: 17/688,245

(22) Filed: Mar. 7, 2022

(65) Prior Publication Data

US 2022/0186482 A1 Jun. 16, 2022

Related U.S. Application Data

(63) Continuation of application No. PCT/CN2020/090946, filed on May 19, 2020.

(30) Foreign Application Priority Data

Sep. 27, 2019 (CN) .......................... 201921639756.5
Sep. 27, 2019 (CN) .......................... 201921639964.5

(51) Int. Cl.
*E03D 11/18* (2006.01)
*E03D 1/30* (2006.01)

(52) U.S. Cl.
CPC ............... *E03D 11/18* (2013.01); *E03D 1/30* (2013.01)

(58) Field of Classification Search
CPC .. E03C 1/102; E03D 1/10; E03D 1/00; E03D 9/08; E03D 11/18
See application file for complete search history.

(56) References Cited

U.S. PATENT DOCUMENTS 3,914,804 A * 10/1975 Schrader ............. A61M 3/0258
4/420.4

FOREIGN PATENT DOCUMENTS

| CN | 203795559 U |   | 8/2014 |
| CN | 204703238 U | * | 10/2015 |
| CN | 207597522 U | * | 7/2018 |
| CN | 108954849 A |   | 12/2018 |

(Continued)

OTHER PUBLICATIONS

International Search Report and English Translation cited in PCT/CN2020/090946, mailed Aug. 11, 2020, 5 pages.
Written Opinion cited in PCT/CN2020/090946, mailed Aug. 11, 2020, 3 pages.
Notice of Reasons of Refusal cited in JP Application No. 2022-513536, mailed Mar. 6, 2023, 6 pages.

(Continued)

*Primary Examiner* — Erin Deery
(74) *Attorney, Agent, or Firm* — Cooper Legal Group, LLC (57) ABSTRACT

The present disclosure discloses an anti-siphonage water storage device, a sanitary water supply device, and a sanitary cleaning device. The anti-siphonage water storage device is set in a cleaning water path of a sanitary cleaning device, and the anti-siphonage water storage device comprises a water tank for storing cleaning water. The water tank is disposed with a water inlet structure and a water outlet structure, and the water tank is disposed with an overflow structure. A water outlet surface of the water inlet structure is higher than an overflow surface of the overflow structure.

15 Claims, 9 Drawing Sheets

(56) References Cited

FOREIGN PATENT DOCUMENTS

| CN | 109972704 | A | 7/2019 |
|---|---|---|---|
| CN | 209323625 | U | 8/2019 |
| EP | 2192242 | A2 | 6/2010 |
| EP | 2505728 | A2 | 10/2012 |
| JP | S61180270 | U | 11/1986 |
| JP | H08120736 | A | 5/1996 |
| JP | 2004360285 | A | 12/2004 |
| JP | 2010024780 | A | 4/2010 |
| JP | 2015068054 | A | 4/2015 |
| JP | 2019132052 | A | 8/2019 |
| JP | 2022513536 | A | 2/2022 |
| KR | 1020050122753 | A | 12/2005 |
| KR | 200405821 | Y1 | 1/2006 |
| KR | 101356185 | B1 | 1/2014 |
| TW | M544320 | U | 7/2017 |
| WO | 2012126287 | A1 | 9/2012 |

OTHER PUBLICATIONS

Notice of Reasons of Refusal cited in JP Application No. 2022-513536, mailed Aug. 31, 2023, 6 pages.
Request of the Submission of an Opinion cited in KR Application No. 1020227007876, mailed Oct. 23, 2023, 16 pages.
Request of the Submission of an Opinion cited in KR Application No. 1020227007876, mailed Jun. 24, 2024, 20 pages.
Decision to Grant a Patent cited in JP Application No. 2022-513536, mailed Feb. 16, 2024, 5 pages.
Request for Appeal cited in JP Application No. 2022-513536, mailed May 19, 2023, 6 pages.
Supplementary Partial European Search Report cited in EP 20868479.5, mailed Dec. 11, 2023, 4 pages.
European Search Opinion cited in EP 20868479.5, mailed Dec. 22, 2023, 5 pages.
Third Party Observation cited in EP 20868479.5, mailed Jul. 25, 2024, 4 pages.

* cited by examiner

ANTI-SIPHONAGE WATER STORAGE DEVICE, SANITARY WATER SUPPLY DEVICE, AND SANITARY CLEANING DEVICE

RELATED APPLICATIONS

This application claims priority to International patent application number PCT/CN2020/090946, filed May 19, 2020, which claims priority to Chinese patent application number 201921639756.5, filed on Sep. 27, 2019, and Chinese patent application number 201921639964.5, filed on Sep. 27, 2019. International patent application number PCT/CN2020/090946, Chinese patent application number 201921639756.5, and Chinese patent application number 201921639964.5 are incorporated herein by reference.

FIELD OF THE DISCLOSURE

The present disclosure relates to a toilet tank and in particular relates to an anti-siphonage water storage device, a sanitary water supply device, and a sanitary cleaning device.

BACKGROUND OF THE DISCLOSURE

The traditional sanitary cleaning device used for hip wash and/or feminine wash uses a constant-pressure valve to stabilize the municipal water supply (i.e., running water) to achieve stable water pressure. However, the actual situation does not meet this expectation. This is because many uncontrollable factors, such as a location and height of the municipal water supply, often cause water pressure fluctuations, which can easily cause a temperature of a water output from the traditional sanitary cleaning device to be suddenly hot or suddenly cold, which seriously affects the user experience. For this reason, a sanitary cleaning device with a water tank has been disclosed in the prior art. This device uses the water tank to store cleaning water to achieve an internal active water supply mode, thereby removing the influence of external pipeline water pressure fluctuations and improving user experience. Since a water outlet surface of a water inlet structure of the water tank is immersed in water, once a negative pressure occurs in the water supply pipe, the water in the water tank will flow back to the water supply pipe, thereby polluting the water source. For this reason, some of the prior art adopts an atmospheric opening, which is in communication with the atmosphere, on a top of the water tank, and some of the prior art adopts a one-way valve component in the water inlet structure of the water tank. However, the method of installing the atmospheric opening leads to problems of leakage or blockage. The method of installing the one-way valve component will increase the cost of the traditional sanitary cleaning device and the installation process of the traditional sanitary cleaning device will be more complicated due to the one-way valve component, and the anti-siphon effect will not be achieved if the one-way valve component is missing or fails.

BRIEF SUMMARY OF THE DISCLOSURE

The present disclosure provides an anti-siphonage water storage device, a sanitary water supply device, and a sanitary cleaning device to solve the deficiencies in the background.

In order to solve the technical problem, a first technical solution of the present disclosure is as follows.

An anti-siphonage water storage device, set in a cleaning water path of a sanitary cleaning device, comprises a water tank for storing cleaning water. The water tank comprises a water inlet structure and a water outlet structure, and the water tank comprises an overflow structure. A water outlet surface of the water inlet structure is higher than an overflow surface of the overflow structure.

In a preferred embodiment, the water inlet structure comprises a water inlet pipe, and a first end of the water inlet pipe comprises a water outlet located in the water tank. A water outlet surface of the water outlet defines the water outlet surface of the water inlet structure, and a second end of the water inlet pipe comprises a water inlet leading to outside of the water tank.

In a preferred embodiment, the water inlet is located on a bottom wall, a side wall, or a top wall of the water tank, or the second end of the water inlet pipe extends outside of the water tank so that the water inlet is located outside of the water tank.

In a preferred embodiment, the overflow structure comprises an overflow pipe, and a top end of the overflow pipe defines an overflow port located in the water tank. An overflow surface of the overflow port defines the overflow surface of the overflow structure, and a bottom end of the overflow pipe comprises a drain port leading to outside of the water tank.

In a preferred embodiment, the overflow pipe is adjacent to or is attached to an inner side of the water tank, and the overflow pipe is disposed away from the water outlet of the water inlet pipe.

In a preferred embodiment, the drain port is located on a bottom wall or a side wall of the water tank, or the bottom end of the overflow pipe extends outside of the water tank so that the drain port is located outside of the water tank.

In a preferred embodiment, the water tank comprises a bottom plate and an upper shell having a bottom end opening. The bottom plate is sealingly connected to the bottom end opening of the upper shell, and the water inlet pipe and the overflow pipe are disposed on the bottom plate or the upper shell. The water outlet structure is disposed on the upper shell or the bottom plate.

In a preferred embodiment, the bottom plate and the upper shell are fixed together by ultrasonic welding, and the overflow pipe, the water inlet pipe, and the bottom plate are integrally injection-molded.

In a preferred embodiment, the overflow pipe, the water inlet pipe, and the upper shell are integrally injection-molded.

A second technical solution of the present disclosure is as follows.

A sanitary water supply device comprises a heater, a water pump, and the anti-siphonage water storage device. The heater is configured to heat the cleaning water provided from the water tank, and the water pump is configured to provide transportation power to transport the cleaning water.

A third technical solution of the present disclosure is as follows.

A sanitary cleaning device comprises a spraying device for spraying cleaning water, and the sanitary water supply device. The spraying device is located at a distal end of the cleaning water path in which the sanitary water supply device is located.

A fourth technical solution of the present disclosure is as follows.

An anti-siphonage water storage device, set in a cleaning water path of a sanitary cleaning device, comprises a water tank for storing cleaning water. The water tank comprises a water outlet and an overflow port, and the water outlet is higher than the overflow port.

In a preferred embodiment, the water tank is disposed with an overflow pipe, the overflow port is located at a top end of the overflow pipe, and a bottom end of the overflow pipe comprises a drain port leading to an outside of the water tank.

In a preferred embodiment, the drain port is located on a bottom wall of the water tank, or the drain port is located at a bottom of a side wall of the water tank.

Compared with the existing techniques, the technical solution has the following advantages.

Since the water tank is disposed with the overflow structure, the water outlet surface of the water inlet structure is higher than the overflow surface of the overflow structure, so that the water tank of the present disclosure not only has an overflow function, but also has an anti-siphonage function, and does not require a one-way valve component to be disposed in the water inlet structure. In this way, the present disclosure avoids an atmospheric opening or assembling one-way valve components, thereby simplifying an assembly process of the present disclosure and reducing material costs.

DETAILED DESCRIPTION OF THE EMBODIMENTS

The present disclosure will be further described below in combination with the accompanying drawings and embodiments.

The height mentioned in the present disclosure refers to a distance between a certain position of a water tank and the ground.

Embodiment 1

Referring to FIGS. 1 to 5, an anti-siphonage water storage device of the present disclosure, set in a cleaning water path of a sanitary cleaning device, comprises a water tank 1 for storing cleaning water, and the water tank 1 comprises a water inlet structure and a water outlet structure. The water tank 1 further comprises an overflow structure, and a water outlet surface of the water inlet structure is higher than an overflow surface of the overflow structure.

Figure 1:
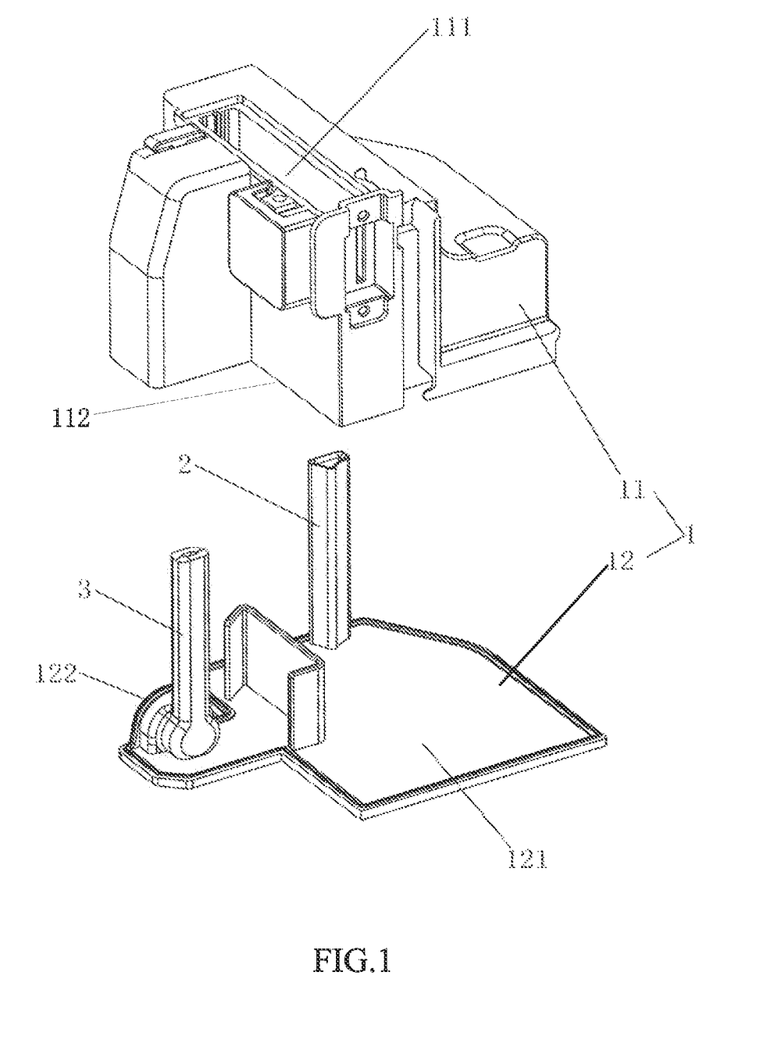
FIG. 1 illustrates an exploded view of an anti-siphonage water storage device of embodiment 1 of the present disclosure.
Figure 3:
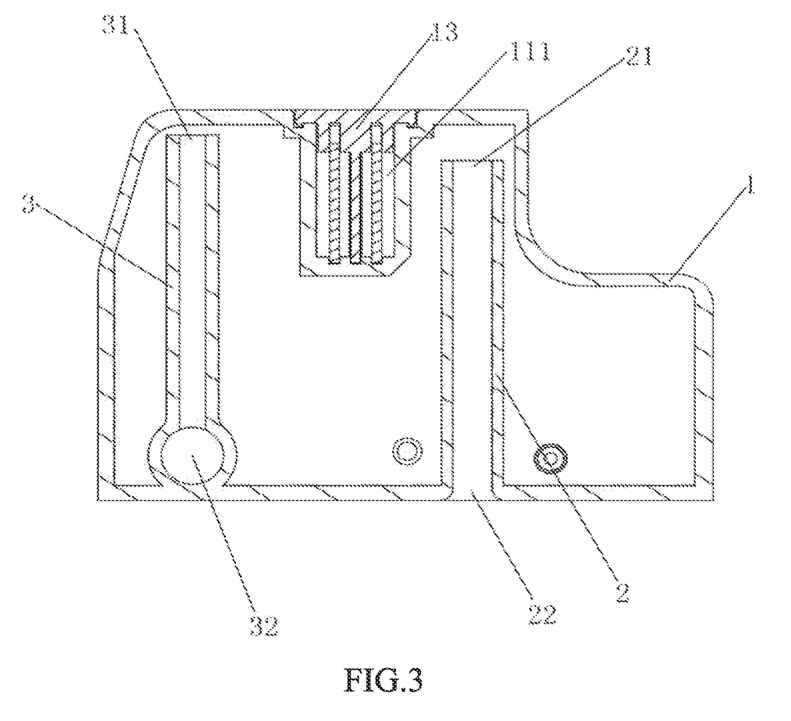
FIG. 3 illustrates a cross-sectional view of the anti-siphonage water storage device of embodiment 1 of the present disclosure.

In this embodiment, the water inlet structure comprises a water inlet pipe 3. A first end of the water inlet pipe 3 comprises a water outlet 31 located in the water tank 1, and a water outlet surface of the water outlet 31 defines the water outlet surface of the water inlet structure. A second end of the water inlet pipe 3 comprises a water inlet 32 leading to outside of the water tank 1. The water outlet surface of the water outlet 31 refers to a surface on which an end edge of the water outlet 31 is located. In other embodiments, the water inlet structure is a water inlet located on a side wall or top wall of the water tank 1, and the water outlet surface of the water inlet structure is located on a surface on which an inner edge of the water inlet is located.

Figure 2:
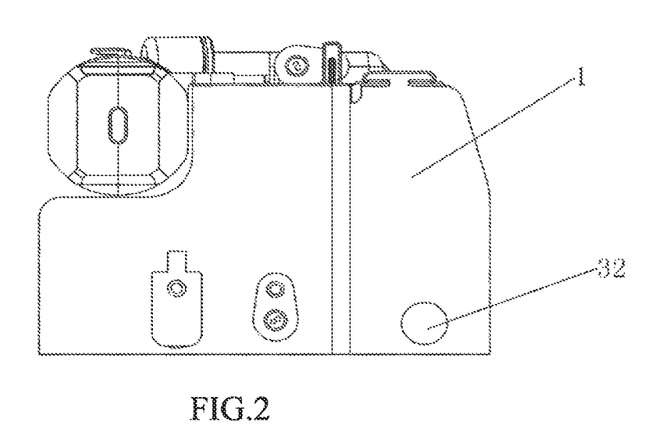
FIG. 2 illustrates a side view of the anti-siphonage water storage device of embodiment 1 of the present disclosure.

In this embodiment, the water inlet 32 is located on the side wall of the water tank 1, as shown in FIG. 2, but the disclosure is not limited to this regard. In other embodiments, the water inlet 32 is located on a bottom wall of the water tank 1.

In this embodiment, the overflow structure comprises an overflow pipe 2. A top end of the overflow pipe 2 defines an overflow port 21 located in the water tank 1, and an overflow surface of the overflow port 21 defines the overflow surface of the overflow structure. A bottom end of the overflow pipe 2 comprises a drain port 22 leading to the outside of the water tank 1. Specifically, the drain port 22 is located on the bottom wall of the water tank 1, but the disclosure is not limited to this regard. In other embodiments, the drain port 22 is located at a bottom of the side wall of the water tank 1. The overflow surface of the overflow port 21 refers to a surface on which an end edge of the overflow port 21 is located. In other embodiments, the overflow structure is an overflow port disposed on the side wall of the water tank 1, and the overflow surface of the overflow structure is a surface on which an inner edge of the overflow port is located.

In this embodiment, the overflow pipe 2 is adjacent to an inner side of the water tank 1, so that a larger space inside the water tank 1 can be provided due to the placement of the overflow pipe 2 to facilitate the installation of other components. Specifically, the overflow pipe 2 is adjacent to an inner surface of an upper shell 11 of the water tank 1 that will be described below. The overflow pipe 2 is away from the water outlet 31 of the water inlet pipe 3, so that a wave of a water surface generated near the water inlet pipe 3 when the cleaning water enters into the water inlet pipe 3 will not cause the cleaning water to flow out of the overflow pipe 2, thereby reducing water loss.

In this embodiment, the water outlet structure comprises a pumping pipe (not shown in the figures) disposed in the water tank 1 and a heating cavity 111 disposed in the water tank 1. A bottom end of the pumping pipe comprises a water inlet opening, and the water inlet opening is adjacent to the bottom wall of the water tank 1. A top of the pumping pipe is in communication with the heating cavity 111, a top end of the heating cavity 111 is open, and the top end of the heating cavity 111 is covered by an end cover 13 that is configured to discharge water. The top end of the overflow pipe 2 is higher than a bottom end of the heating cavity 111, so the water surface in the water tank 1 can submerge the heating cavity 111, so that an external heat dissipation of the heating cavity 111 can be used to preheat the cleaning water in the water tank 1. In other embodiments, the water outlet structure is a water outlet hole disposed on the side wall or bottom wall of the water tank 1.

In this embodiment, the water tank 1 comprises a bottom plate 12 and the upper shell 11 having a bottom end opening 112, and the bottom plate 12 is sealingly connected to the bottom end opening 112 of the upper shell 11. Specifically, all sides of the bottom plate 12 and the upper shell 11 are fixed together by ultrasonic welding. The overflow pipe 2 and the water inlet pipe 3 are erected on the bottom plate 12, and the overflow pipe 2, the water inlet pipe 3, and the bottom plate 12 are integrally injection-molded. The bottom plate 12 specifically comprises a flat main plate 121 and a small side wall 122 protruding from an edge of a top surface of the flat main plate 121. The flat main plate 121 defines the bottom wall of the water tank 1. All side walls of the upper shell 11 and the small side wall 122 define the side wall of the water tank 1, and the water inlet 32 of the water inlet pipe 3 is located on the small side wall 122. The water outlet structure is disposed on the upper shell 11.

Figure 4:
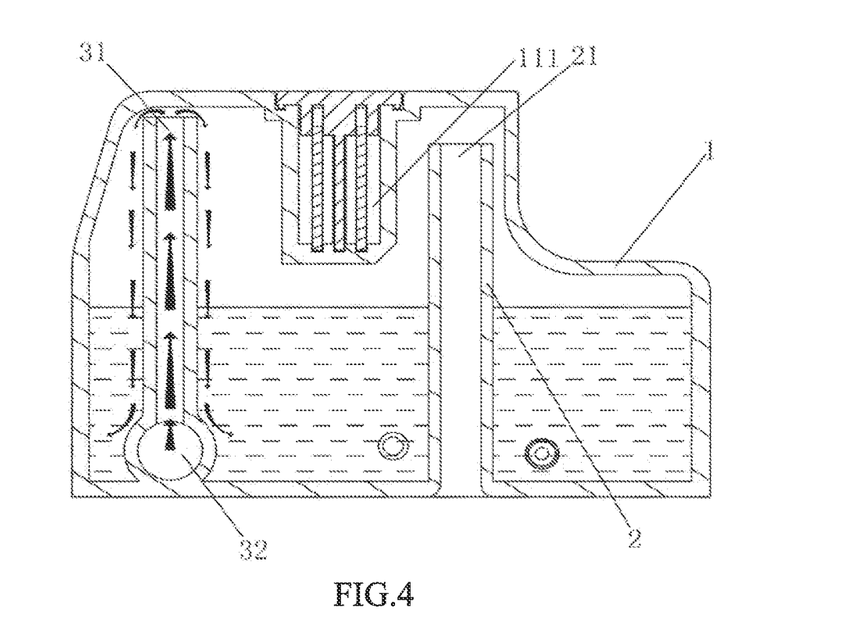
FIG. 4 illustrates a cross-sectional view of the anti-siphonage water storage device of embodiment 1 of the present disclosure during a water intake process.
Figure 5:
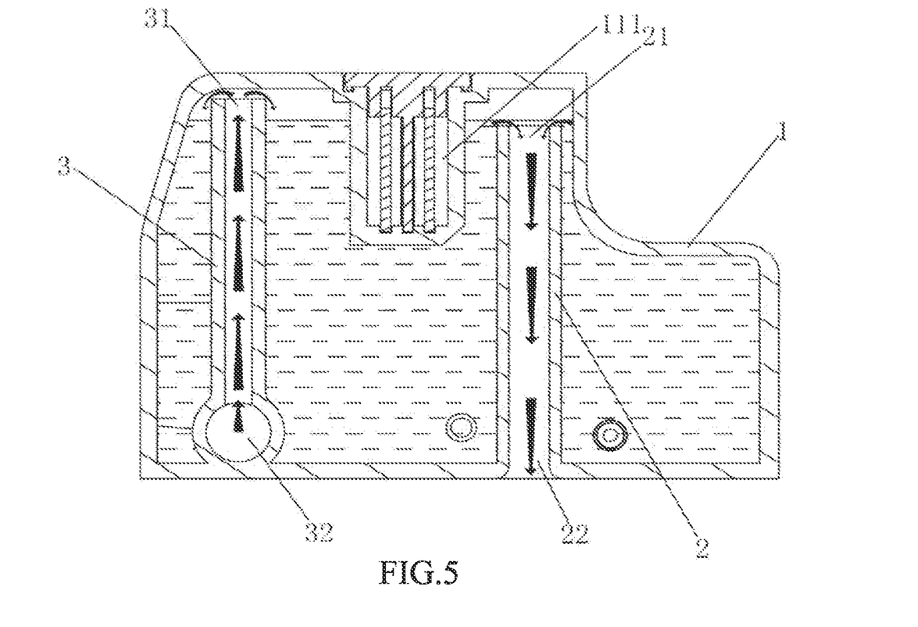
FIG. 5 illustrates a cross-sectional view of the anti-siphonage water storage device of embodiment 1 of the present disclosure during a water overflow process.

In the anti-siphonage water storage device of the present disclosure, when the cleaning water enters, the cleaning water enters from the water inlet 32, flows upward along an internal passage of the water inlet pipe 3, and finally flows out from the water outlet 31 of the water inlet pipe 3 and falls into the water tank 1, as shown in FIG. 4. During a water intake process, air in the water tank 1 is gradually squeezed and discharged from the overflow pipe 2. When a device used to control the water intake (the device generally includes a water level detector set in the water tank 1, a solenoid valve set at the water inlet 32, and a controller that coordinates a working status of the water level detector and the solenoid valve) fails, causing the water inlet 32 to continue to be supplied with the cleaning water and causing the cleaning water in the water tank 1 to exceed a maximum water level line, the excess cleaning water will enter the overflow port 21 at a top of the overflow pipe 2 and flow to the drain port 22 along an internal passage of the overflow pipe 2. As shown in FIG. 5, the excess cleaning water finally falls into a toilet tank.

Since the water outlet 31 is higher than the overflow port 21, the water outlet 31 will never be submerged in the cleaning water, but instead the water outlet 31 will remain in an air layer above the overflow port 21. Therefore, when a water supply pipe connected to the water inlet 32 generates a negative pressure, the cleaning water in the water tank 1 will not flow back, thereby avoiding pollution of the water source.

The overflow pipe 2 can exhaust gas and have an overflow function. When the overflow pipe 2 performs the overflow function, the cleaning water can be directly discharged into the toilet tank without being connected to other pipelines, so that an appearance of the water tank 1 of the present disclosure is more concise and beautiful and the anti-siphonage water storage device is easier to assemble.

Figure 6:
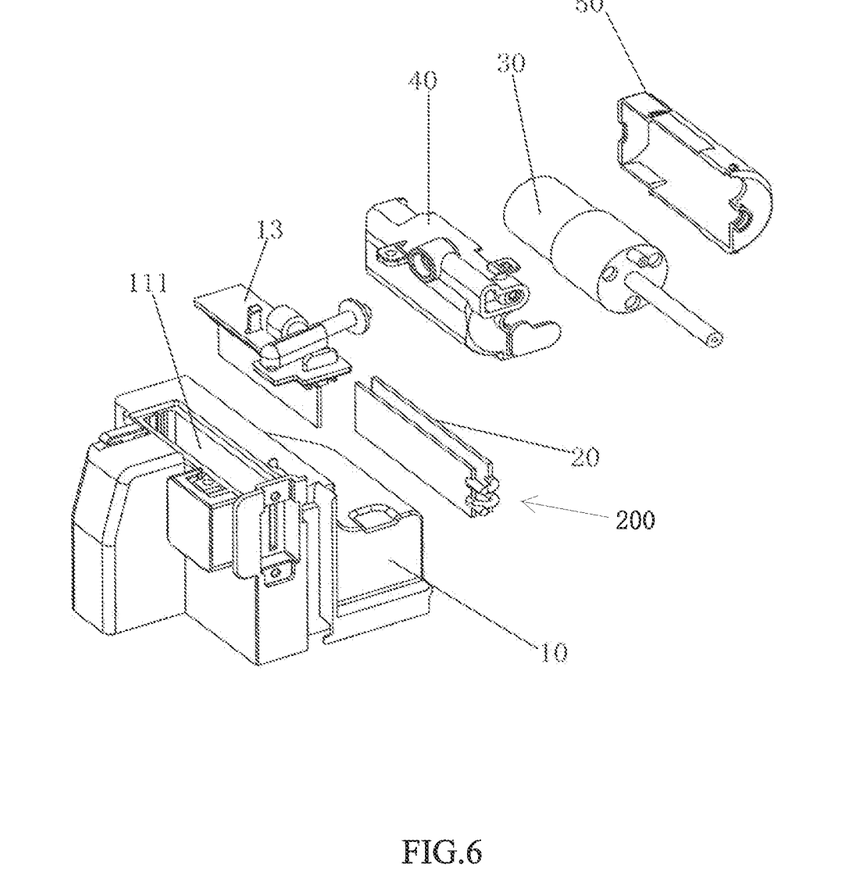
FIG. 6 illustrates an exploded view of a sanitary water supply device of embodiment 1 of the present disclosure.
Figure 7:
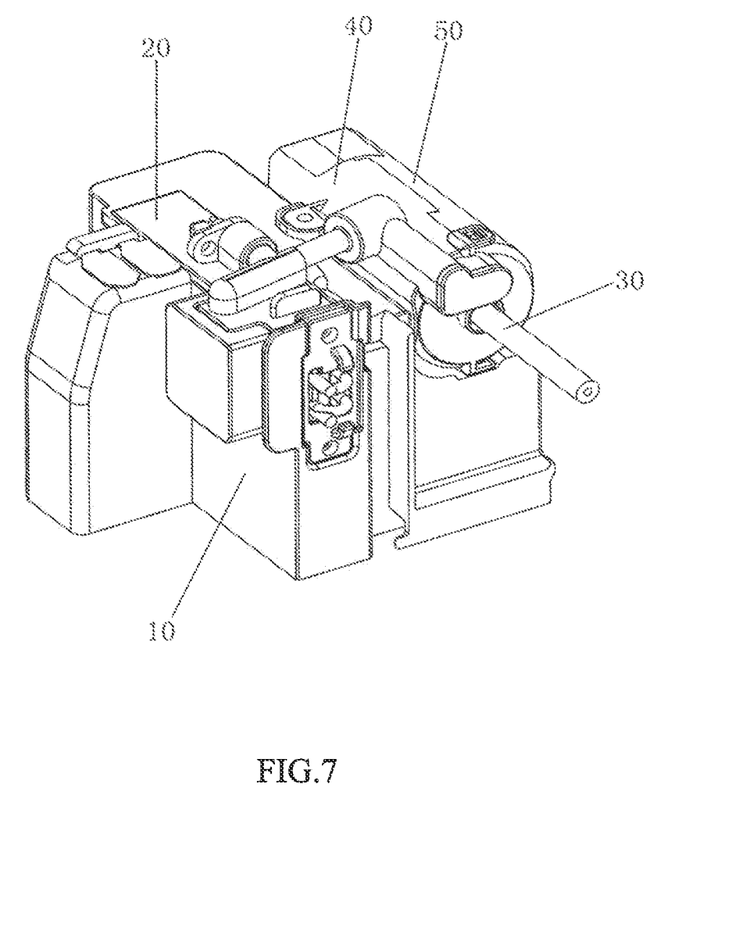
FIG. 7 illustrates a perspective view of the sanitary water supply device of embodiment 1 of the present disclosure.

Referring to FIGS. 6 and 7, a sanitary water supply device of the present disclosure comprises a heater 200, a water pump 30, and a water tank 10. The water tank 10 adopts the anti-siphonage water storage device of the present disclosure described in embodiment 1. The heater 200 heats the cleaning water provided from the water tank 10, and the water pump 30 provides transportation power to transport the cleaning water, so that the cleaning water entering into the water tank 1 flows through the heater 200 and is output.

In this embodiment, the heater 200 is of an instant heating type and comprises a ceramic heating plate 20 disposed in the heating cavity 111, that is defined within the water tank 10, through the end cover 13. The water pump 30 is disposed between two protecting covers 40, 50, and the water pump 30 is connected to the end cover 13 and in communication with the heating cavity 111 through a first one 40 of the two protecting covers 40, 50.

A sanitary cleaning device of the present disclosure comprises a spraying device (not shown in the figures) for spraying the cleaning water and further comprises the sanitary water supply device of the present disclosure described in embodiment 1. The spraying device is located at a distal end of the cleaning water path in which the sanitary water supply device is located. Specifically, the spraying device is located on a downstream side of the water pump 30, and the spraying device sprays the cleaning water pumped by the water pump 30 to achieve hip washing or feminine washing.

Embodiment 2

Referring to FIGS. 8-11. The difference between an anti-siphonage water storage device of embodiment 2 of the present disclosure and the embodiment 1 is that a bottom end of the water inlet pipe 3 extends outside of the water tank 1, so that the water inlet 32 is located outside of the water tank 1. The bottom end of the overflow pipe 2 also extends outside of the water tank 1 so that the drain port 22 is located outside of the water tank 1.

Figure 8:
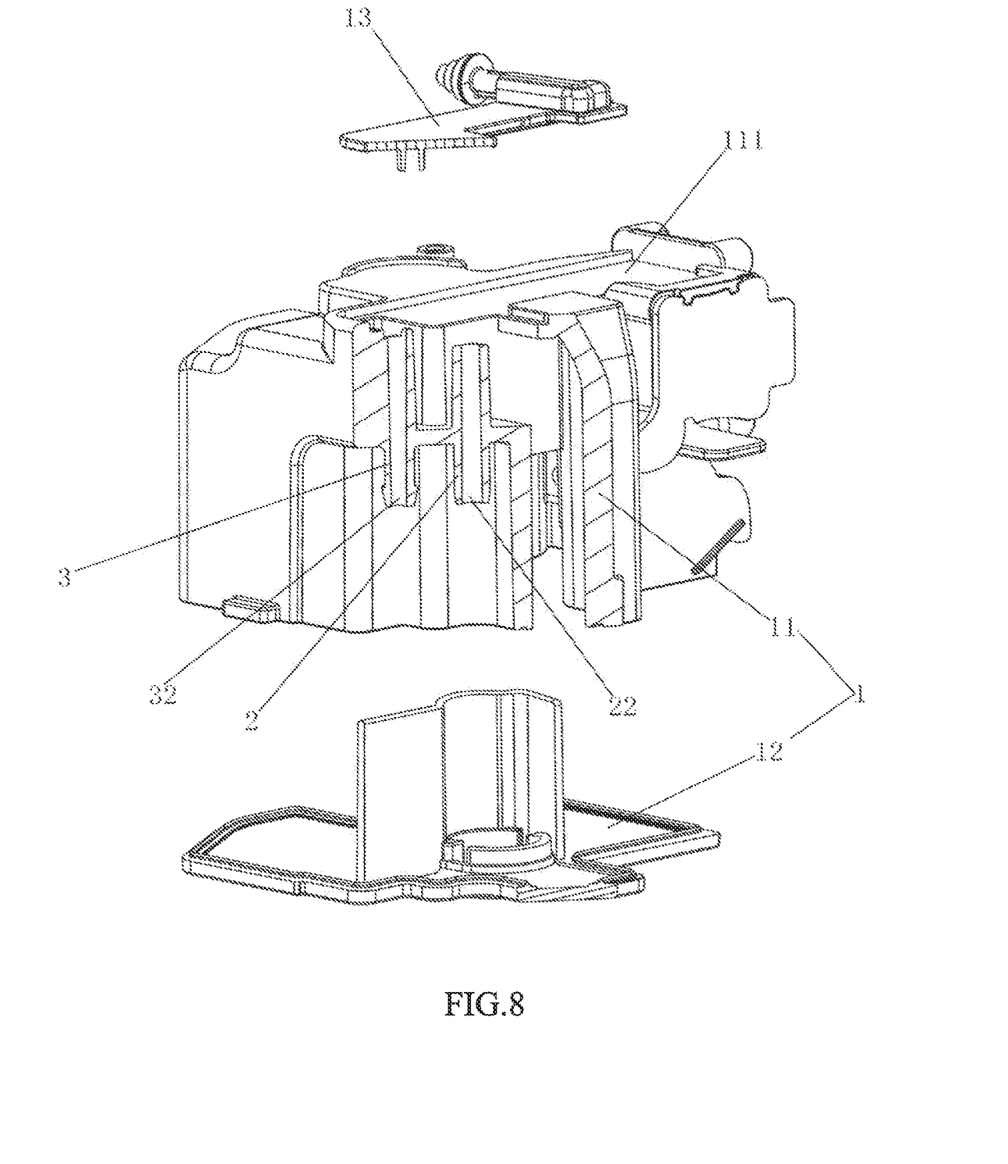
FIG. 8 illustrates an exploded, cross-sectional view of an anti-siphonage water storage device of embodiment 2 of the present disclosure.
Figure 9:
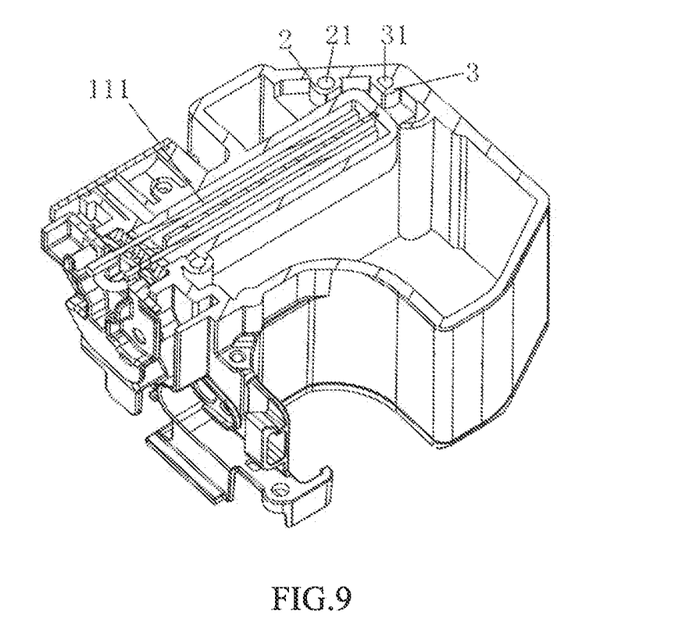
FIG. 9 illustrates a perspective, cross-sectional view of an upper shell of embodiment 2 of the present disclosure.

In this embodiment, the water tank 1 also comprises the upper shell 11 and the bottom plate 12, and the overflow pipe 2 and the water inlet pipe 3 are all integrally injection-molded at a middle of the upper shell 11 and are attached to an inner surface of the upper shell 11. The upper shell 11 has a top opening that is covered by the end cover 13.

Figure 10:
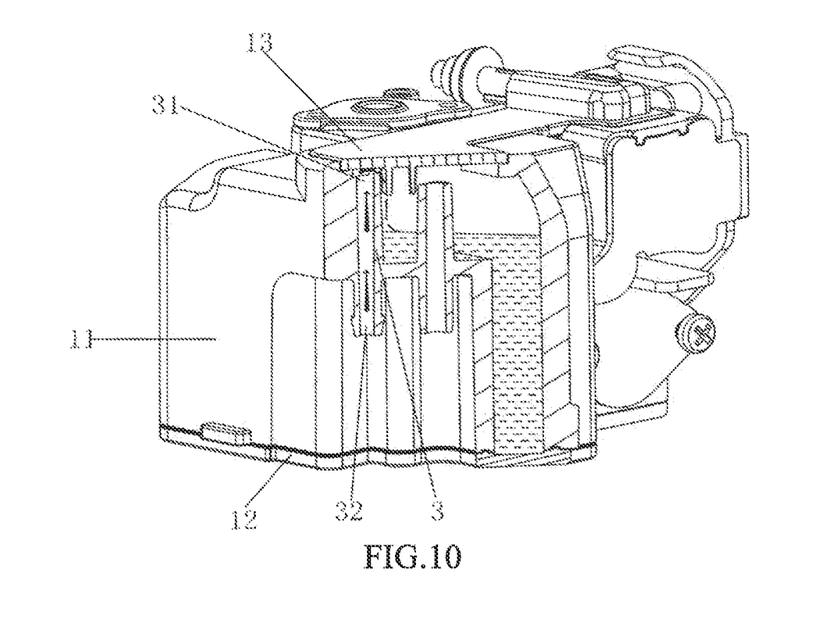
FIG. 10 illustrates a perspective, cross-sectional view of the anti-siphonage water storage device of embodiment 2 of the present disclosure during a water intake process.
Figure 11:
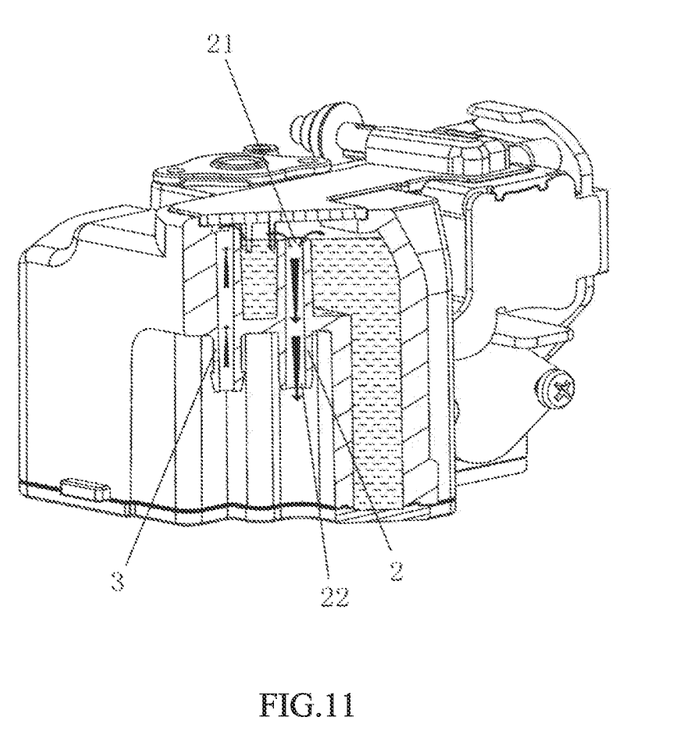
FIG. 11 illustrates a perspective, cross-sectional view of the anti-siphonage water storage device of embodiment 2 of the present disclosure during a water overflow process.

When the cleaning water enters, the cleaning water enters from the water inlet 32, flows upward along the internal passage of the water inlet pipe 3, and finally flows out from the water outlet 31 of the water inlet pipe 3 and falls into the water tank 1, as shown in FIG. 10. During the water intake process, the air in the water tank 1 is gradually squeezed and discharged from the overflow pipe 2. When the device used to control the water intake (the device generally includes the water level detector set in the water tank 1, the solenoid valve set at the water inlet 32, and the controller that coordinates the working status of the water level detector and the solenoid valve) fails, causing the water inlet 32 to continue to be supplied with the cleaning water and causing the cleaning water in the water tank 1 to exceed the maximum water level line, the excess cleaning water will enter into the overflow port 21 at the top of the overflow pipe 2 and flow to the drain port 22 along the internal passage of the overflow pipe 2, as shown in FIG. 11. The excess cleaning water finally falls into the toilet tank.

Figure 12:
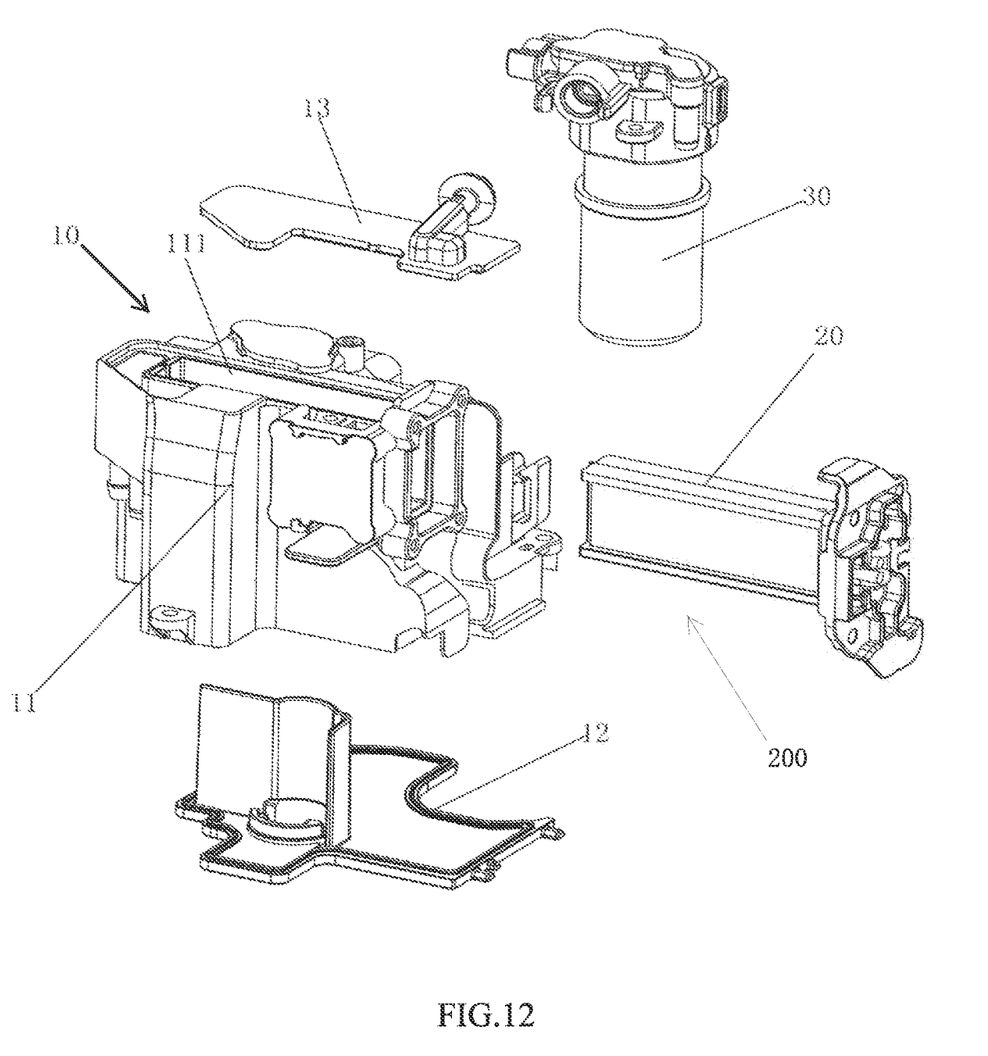
FIG. 12 illustrates an exploded view of a sanitary water supply device of embodiment 2 of the present disclosure.

Referring to FIG. 12, a sanitary water supply device of the present disclosure comprises the heater 200, the water pump 30, and the water tank 10. The water tank 10 adopts the water storage device with overflow function of the present disclosure described in embodiment 2. The heater 200 heats the cleaning water provided from the water tank 10, and the water pump 30 provides transportation power to transport the cleaning water.

In this embodiment, the heater 200 is of an instant heating type and comprises a ceramic heating plate 20 disposed in the heating cavity 111, that is defined within the water tank 10, through the end cover 13. A water inlet end of the water pump 30 is in communication with the heating cavity 111 through the end cover 13.

A sanitary cleaning device of the present disclosure comprises a spraying device for spraying the cleaning water (not shown in the figures) and also comprises the sanitary water supply device of the present disclosure described in embodiment 2. The spraying device is located at a distal end of the cleaning water path in which the sanitary water supply device is located. Specifically, the spraying device is located on a downstream side of the water pump 30 and sprays the cleaning water pumped by the water pump 30.

The above embodiments are only used to further illustrate an anti-siphonage water storage device, sanitary water supply device, and sanitary cleaning device of the present disclosure, but the present disclosure is not limited to the embodiments. Thus, it is intended that the present disclosure cover any modifications and variations of the presently presented embodiments provided they are made without departing from the appended claims and the specification of the present disclosure.

What is claimed is:

1. An anti-siphonage water storage device, set in a cleaning water path of a sanitary cleaning device, comprising:
   a water tank for storing cleaning water, and
   a heating cavity disposed in the water tank, wherein:
      the water tank comprises a water inlet structure,
      the water tank comprises an overflow structure comprising an overflow pipe,
      the water inlet structure comprises a water inlet pipe,
      the water inlet pipe comprises a water outlet located in the water tank,
      the overflow pipe is disposed away from the water outlet of the water inlet pipe,
      a water outlet surface of the water outlet defines a water outlet surface of the water inlet structure,
      the heating cavity is configured to in fluid communication with a water pump,
      the water pump provides transportation power to transport the cleaning water,
      the heating cavity heats the cleaning water provided from the water tank,
      the water outlet surface of the water inlet pipe is higher than an overflow surface of the overflow pipe to enable excess cleaning water of the cleaning water to flow out of the overflow surface of the overflow pipe, and
      the overflow surface of the overflow pipe is higher than a bottom end of the heating cavity, so that an external heat dissipation of the heating cavity is configured to preheat the cleaning water in the water tank.

2. The anti-siphonage water storage device according to claim 1, wherein:
   a first end of the water inlet pipe comprises the water outlet,
   and
   a second end of the water inlet pipe comprises a water inlet leading to outside of the water tank.

3. The anti-siphonage water storage device according to claim 2, wherein:
   the water inlet is located on a bottom wall, a side wall, or a top wall of the water tank, or
   the second end of the water inlet pipe extends outside of the water tank so that the water inlet is located outside of the water tank.

4. The anti-siphonage water storage device according to claim 1, wherein:
   a top end of the overflow pipe defines an overflow port located in the water tank,
   an overflow surface of the overflow port defines the overflow surface of the overflow structure, and
   a bottom end of the overflow pipe comprises a drain port leading to outside of the water tank.

5. The anti-siphonage water storage device according to claim 4, wherein:
   the overflow pipe is adjacent to or is attached to an inner side of the water tank, and
   the overflow pipe is disposed away from the water outlet of the water inlet pipe.

6. The anti-siphonage water storage device according to claim 4, wherein:
   the drain port is located on a bottom wall or a side wall of the water tank, or
   the bottom end of the overflow pipe extends outside of the water tank so that the drain port is located outside of the water tank.

7. The anti-siphonage water storage device according to claim 1, wherein:
   the water tank comprises a bottom plate and an upper shell having a bottom end opening,
   the bottom plate is sealingly connected to the bottom end opening of the upper shell,
   the water inlet pipe and the overflow pipe are disposed on the bottom plate or on the upper shell, and
   a water outlet structure is disposed on the upper shell or the bottom plate.

8. The anti-siphonage water storage device according to claim 7, wherein:
   the bottom plate and the upper shell are fixed together by ultrasonic welding, and
   the overflow pipe, the water inlet pipe, and the bottom plate are integrally injection-molded.

9. The anti-siphonage water storage device according to claim 7, wherein the overflow pipe, the water inlet pipe, and the upper shell are integrally injection-molded.

10. A sanitary water supply device, comprising:
    a heater,
    and
    the anti-siphonage water storage device according to claim 1, wherein:
       the heater is disposed in the heating cavity and is configured to heat the cleaning water provided from the water tank, and
       the water pump is configured to provide transportation power to transport the cleaning water.

11. The sanitary cleaning device, comprising:
    a spraying device for spraying the cleaning water, and
    the sanitary water supply device according to claim 10, wherein:
       the spraying device is located at a distal end of the cleaning water path in which the sanitary water supply device is located.

12. The anti-siphonage water storage device according to claim 1, wherein:
    the water tank comprises a bottom plate,
    the overflow pipe and the water inlet pipe are erected on the bottom plate, and
    a water inlet of the water inlet pipe is disposed below the water outlet.

13. An anti-siphonage water storage device, set in a cleaning water path of a sanitary cleaning device, comprising:
a water tank for storing cleaning water, and
a heating cavity disposed in the water tank, wherein:
the water tank comprises a water inlet structure and an overflow port,
the water inlet structure comprises a water outlet located in the water tank,
the overflow port is disposed away from the water outlet,
the heating cavity is configured to be in fluid communication with a water pump,
the water pump provides transportation power to transport the cleaning water,
the heating cavity heats the cleaning water provided from the water tank,
a water outlet surface of the water outlet is higher than an overflow surface of the overflow port to enable excess cleaning water of the cleaning water to flow out of the overflow surface of the overflow port, and
the overflow surface of the overflow port is higher than a bottom end of the heating cavity, so that an external heat dissipation of the heating cavity is configured to preheat the cleaning water in the water tank.

14. The anti-siphonage water storage device according to claim 13, wherein:
the water tank comprises an overflow pipe,
the overflow port is located at a top end of the overflow pipe, and
a bottom end of the overflow pipe comprises a drain port leading to outside of the water tank.

15. The anti-siphonage water storage device according to claim 14, wherein:
the drain port is located on a bottom wall of the water tank, or
the drain port is located at a bottom of a side wall of the water tank.

* * * * *